United States Patent [19]

Zouzoulas

[11] 4,307,799

[45] Dec. 29, 1981

[54] LINEAR ACTUATOR

[75] Inventor: John Zouzoulas, Williamsville, N.Y.

[73] Assignee: Andco Actuator Products, Inc., Buffalo, N.Y.

[21] Appl. No.: 100,281

[22] Filed: Dec. 5, 1979

[51] Int. Cl.³ .............................................. H01H 3/16
[52] U.S. Cl. .................................... 192/150; 192/141; 200/47; 318/369; 318/375
[58] Field of Search ................ 192/141, 150; 318/475, 318/469; 74/89.15; 200/47

[56] References Cited

U.S. PATENT DOCUMENTS

| | | | |
|---|---|---|---|
| 1,268,358 | 6/1918 | Jones | 200/47 |
| 2,517,373 | 8/1950 | Ambrose | 318/475 |
| 2,602,664 | 7/1952 | Matchett | 192/150 X |
| 2,854,113 | 9/1958 | Hallden | 192/141 |
| 3,068,332 | 12/1962 | Jeffrey | 200/47 X |
| 3,369,087 | 2/1968 | Eller | 318/475 X |
| 3,480,746 | 11/1969 | Fry | 318/475 X |
| 3,675,751 | 7/1972 | Fortner | 318/469 X |
| 3,851,538 | 12/1974 | Denkowski et al. | 192/150 X |
| 3,898,399 | 8/1975 | Yasui et al. | 200/47 |
| 4,114,747 | 9/1978 | Eller | 200/47 X |

FOREIGN PATENT DOCUMENTS 1003766 9/1965 United Kingdom ................ 200/47

*Primary Examiner*—Rodney H. Bonck
*Attorney, Agent, or Firm*—LeBlanc, Nolan, Shur & Nies

[57] ABSTRACT

A linear actuator for providing a thrust force for actuating various movable members, such as, for example lever arms, cranks, slides and valve flaps. The thrust force is applied by an extension rod that is arranged within a housing so as to extend in an axial direction along the housing and out from the housing. The extension rod has a load connector mounted on the end outside of the housing for connection to the movable member to which the thrust force is to be applied. A drive screw is attached to the extension rod so that rotation of the drive screw is translated into an axial displacement of the extension rod. A drive motor serves to rotate the drive screw. Either when a blockage of the movable member occurs or when the extension rod has reached the end of its path of travel, any attempt for continued movement of the extension rod significantly increases the thrust force applied to the rod. In order to prevent the continued application of such force and resulting damage to the system, a thrust control mechanism is provided for terminating operation of the drive motor when the thrust force exceeds selected thrust force limits. The thrust control mechanism includes an adjustable device for enabling the thrust force limits to be selectively adjusted. Such adjustments for selecting the limits of the thrust force can be made without requiring disassembly or any adjustment to the major working mechanism of the linear actuator.

26 Claims, 8 Drawing Figures

LINEAR ACTUATOR

BACKGROUND OF THE INVENTION

The present invention relates to linear actuators and thrust force control mechanisms for such actuators.

Linear actuators are typically utilized wherever a thrust force is used for applying linear motion. Examples of the utilization of such a thrust force is in the operation of lever arms, cranks, slides and valve flaps. Such actuators are utilized for alternatively moving objects between predetermined limits. The actuator can be utilized for moving the movable member between positions within such predetermined limits by the utilization of appropriate feedback signals.

The typical linear actuator includes a drive motor which is connected to a drive screw through a pin type coupling. Rotation of the drive screw by the motor causes a mating drive nut and attached extension rod to move in an axial direction along a housing and to extend out of the housing. The object to which the thrust force is to be applied is coupled to the extension rod through a clevis mounted on the end of the extension rod.

When continuation of either the extension of the drive rod from the housing or withdrawal of the drive rod back into the housing is prevented, either due to completion of the stroke or by some external obstruction, an overload thrust protection system terminates operation of the drive motor. The overload thrust protection system utilized in accordance with the prior art is preset at the factory based on the arrangement of the various internal parts of the linear actuator. When the preset overload force has been obtained, an overload cam actuates a micro-switch which then interupts the power to the drive motor. An exemplary embodiment of such a linear actuator with an overload protection system is shown in U.S. Pat. No. 3,369,087 to Eller, the disclosure of which is incorporated herein by reference.

The prior art linear actuators do not allow for any adjustability of the thrust force limits to be selected at the site of operation of the linear actuators. In the above mentioned patent to Eller, the only possibility for adjustment of the thrust overload limits is by rearranging the position of the switches which requires disassembly of the machine. Alternatively, the requisite thrust force for overcoming the overload protection system can be modified by utilizing different springs for providing a greater or smaller force against the movement of the moveable actuating member; here again, disassembly and modification of the machine is necessary. In many situations, however, it is desirable for the thrust force limits to be selectively adjusted at the job site depending on the particular operation of the linear actuator. The prior art linear actuators, however, require disassembly of the actuator in order to provide any adjustability of the thrust overload limits. Hence, the switches that are provided are only utilized for terminating operation of the motor when maximum overloads have occured in accordance with the arrangement of the parts during manufacturing of the linear actuator.

In the operation of the prior linear actuators, if a breakdown in the switch should occur, there is no further protection against an overload force being applied to the springs so as to prevent total collapse of the springs and damage to them. Instead, total reliance is placed on the operation of the overload switches.

A further drawback of the prior linear actuators was the failure to fully protect the extension rods against lateral forces. Such lateral forces could cause malfunction of the actuator and if large enough then permanent damage to the actuator.

SUMMARY OF THE INVENTION

An object of the present invention is to provide an improved linear actuator.

Another object of the present invention is to provide a linear actuator having a thrust control system in which the thrust force limits can be selectively adjusted without requiring disassembly of the linear actuator.

A further object of the present invention is to provide a linear actuator with a thrust control assembly for terminating operation of the actuator when the thrust force on the drive screw exceeds a selected thrust force limit by interrupting the drive motor circuit.

Still another object of the present invention is to provide a linear actuator in which the springs surrounding the driver rod are protected against collapse due to the occurrence of an excessive thrust force.

A still further object of the present invention is to provide a linear actuator having a sealed housing section containing the drive screw and extension rod of the actuator so that housing section can be filled with a lubricant.

Still a further object of the present invention is to provide a linear actuator in which the extension rod is protected against damage from lateral forces on the extension rod.

The above-noted objectives are achieved by the construction of a linear actuator in accordance with the present invention. The actuator includes an elongated housing in which an extendable rod is mounted for axial movement through the housing so as to extend out of the housing. A motor for applying the axial drive force to the extendable rod is attached at the opposite end of the elongated housing. At the end of the extendable rod is a load connecting member such as a clevis. A drive screw is attached to the extendable rod so that rotation of the drive screw causes axial displacement of the extendable rod. A driver rod couples the motor driving mechanism to the driver screw.

A thrust control mechanism is coupled to the driver rod for interrupting the electric current to the drive motor of the linear actuator when the thrust force on the drive screw exceeds selected thrust force limits. The adjustment of the thrust force limits can be accomplished without any necessity for disassembling or restructuring the linear actuator. The thrust control mechanism is electrically coupled to the drive motor so that the interruption of the electric circuit causes the operation of the drive motor to be terminated. By terminating the operation of the motor, the driving force in the direction in which the drive screw was driving the extendable rod is terminated. The motor remains deactivated until the motor is re-energized for driving the drive screw in the opposite direction.

The linear actuator includes two axially spaced bearings positioned along the drivr rod. A plurality of springs are arranged between the bearings around the driver rod for separating the bearings under normal operating conditions. Typically, double acting spring members are utilized for this purpose. The thrust control mechanism is set so as to sense when an overload thrust force causes the driver rod and the bearings to overcome the force of the springs and to axially move by a preselected distance. Such force also causes the bearings to move closer together. The distance by which the driver rod and the bearings must move before actuation of the thrust control mechanism is dependent upon the setting of the thrust control mechanism.

A thrust limit sleeve is arranged so as to surround the springs that are positioned between the two bearings. The thrust limit sleeve prevents the bearings from moving closer together than the length of the sleeve. Such limitation on the movement of the bearings acts to prevent collapse and damage of the springs if an excessive thrust force is created within the linear actuator without activating the thrust control mechanism so as to terminate operation of the motor.

The thrust control mechanism includes a rotatable member that is positioned along the driver rod for rotation when any axial movement of the driver rod occurs. During normal operation of the linear actuator, the driver rod serves to rotate the drive screw but is not subjected to axial movement since the forces of the springs prevent such axial movement. Such axial movement only occurs when the axial movement of the extendable rod is prevented from occuring such as for those reasons previously discussed. The thrust force then increases as the motor continues to rotate the driver rod and the thrust force then overcomes the balancing forces of the spring thereby causing axial movement of the driver rod.

The thrust control mechanism also includes a pivotable member which is attached to the rotatable member so that the pivotable member pivots upon rotation of the rotatable member. The rotatable member can be formed by a rotatable bearing positioned within a recess in the driver rod so that any axial movement of the driver rod will rotate the bearing and pivot the pivotable member.

The thrust control mechanism further includes two switches which are actuated upon the occurrence of a selected thrust force in either axial direction. Each switch is responsible for interrupting the electric crcuit for the motor when a pre-determined thrust force is reached in one axial direction. One of these switches is arranged as part of the control circuit for extending the rod and the other switch is part of the control circuit for retracting the rod. These switches can be either in the motor drive circuit directly or part of the starter circuit for the drive circuit, which is preferrable when the motor is a three phase motor. Each of the switches has an actuating member for actuating the respective switch. The pivotable member is arranged so as to be coupled to one of the actuating members when pivoted in one of the two directions. The required distance for such pivoting movement for actuating the switches is dependent upon the selected setting of the thrust switch mechanism, which setting is indicated on the dial of the mechanism. The actuation of the switch results in the interruption of the electric circuit of the drive motor for terminating the operation of such motor as previously discussed.

Each of the switches of the thrust control mechanism is a micro-switch with its actuating button normally being depressed by a pair of spring biased arms. The depression of the actuating buttons of the micro-switches keep the electric circuit to the drive motor closed. Each of the spring biased arms is spaced away from its respective pointer on the thrust force selecting dial by a distance that is dependent upon the selected level of force at which the respective switch is to be actuated.

The spaced away distance between the pointers and their respective spring biased arms is marked on the mating thrust mechanism selection dial. When the thrust force reaches the selected level, one of the pointers, depending on the direction of the force, is moved into contact with a corresponding one of the spring biased arms which in turn pivots the shaft and the upper end of the arm moves away from the corresponding actuating button of the micro-switch. Actuation of the switch then interrupts the electric circuit to the drive motor and terminates the drive force.

At the end of the housing a support member is provided through which the extendable rod passes. Arranged at the other end of the extendable rod is a drive nut which moves with the extendable rod and assists in translating the rotational movement of the drive screw to the axial movement of the extendable rod. A plurality of guide rods, generally four, are arranged within the housing and extend between the support member and the drive nut. Preferably, the guide rods are secured at one end to the support member at the end of the housing and to an inner section of the housing. The drive nut then moves along the guide rods which prevent any rotational movement of the drive nut thereby enabling the rotational movement to be translated into the axial movement of the extendable member. The drive nut bears against the inner wall of the housing so as to also act as a support member for the extendable rod. Thus, the drive nut along with the end support member secures the extendable rod in two locations with respect to the housing so as to support the extendable rod against lateral forces.

Normally prior linear actuators have been supported by a trunnion arranged somewhere along the middle of the longitudinal extension of the linear actuator, although some actuators have used a rear mounting. In accordance with the linear actuator of the present invention, however, this trunnion is preferably positioned at the rear of the linear actuator, i.e. at the back end of the motor. By mounting the trunnion at that rear location, the angle of pivoting motion of the actuator during operation is less than it would be with a center mounted support. The decrease in the required angle of pivot during the operation of the linear actuator decreases the possibility for misalignment of the load during operation.

DESCRIPTION OF THE PREFERRED EMBODIMENT

Figure 1:
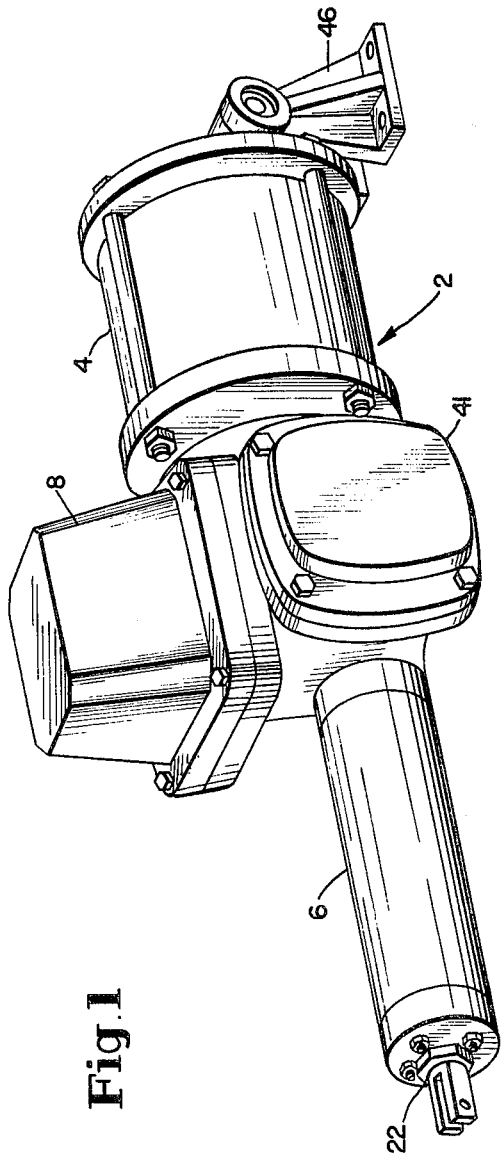
FIG. 1 is a perspective view of a linear actuator constructed in accordance with the present invention.

A linear actuator 2 has an elongated housing 6 extending from a motor 4, such as shown in FIG. 1. The entire actuator is mounted on a trunnion mounting 46 which is secured to a support member. Extending from housing 6 is an extendable rod 10 with a clevis 22 secured to its free end.

Figure 2:
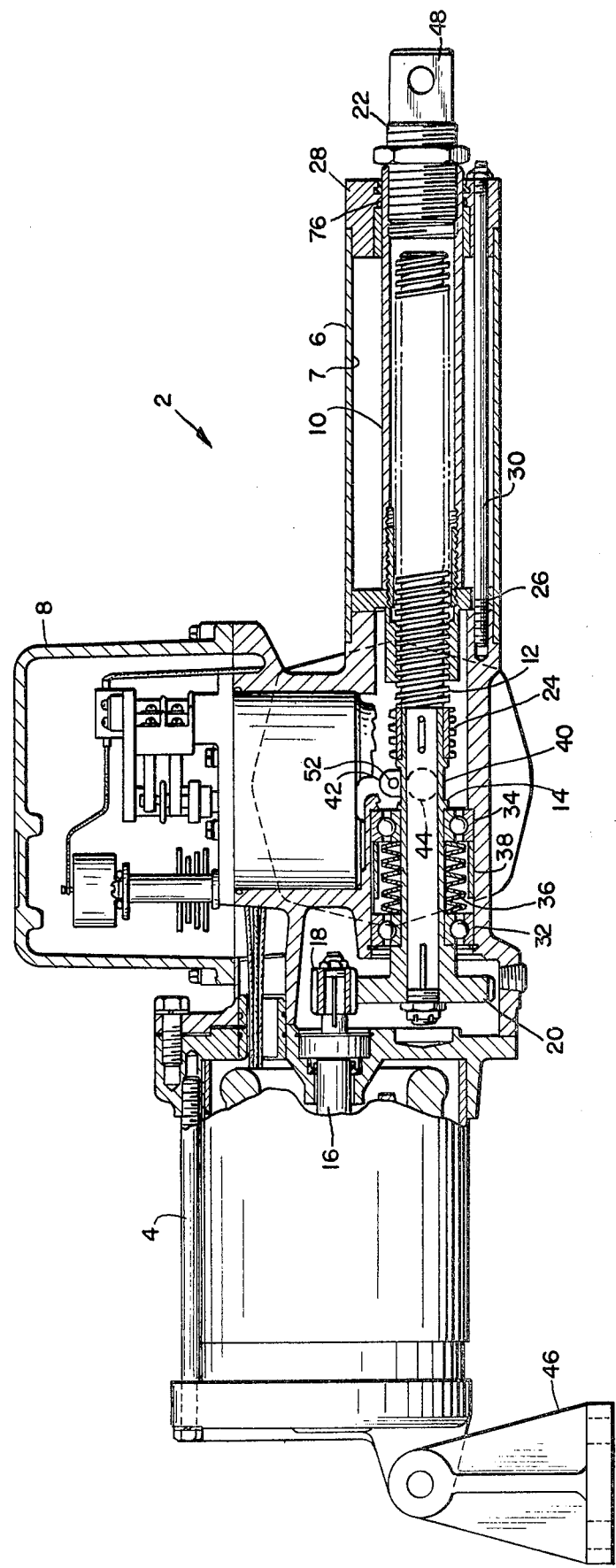
FIG. 2 is a side elevational sectional view of the linear actuator illustrated in FIG. 1.

Extendable rod 10 extends in an axial direction within tubular housing 6, such as shown in FIG. 2. Extendable rod 10 is mounted on a drive screw 12 so that rotation of drive screw 12 will cause extendable rod 10 to move in an axial direction either out from or back into tubular housing 6. Drive screw 12 is driven by motor 4 through a rotational force applied to drive rod 14. Drive rod 14 is securely attached to drive screw 12. Drive rod 14 and drive screw 12 can be formed from either a single shaft or two shafts coupled together. Drive rod 14 is coupled to motor shaft 16 through a motor pinion 18 and a drive gear 20.

As drive screw 12 is rotated, extendable rod 10 is prevented from rotation. Instead the rotational movement of drive screw 12 is translated into the axial movement of extendable rod 10 through a drive nut 26. Drive nut 26, which is mounted on extendable rod 10, is secured against rotation by a plurality of guide rods 30, preferably four rods. The drive nut is internally threaded so that the rotational movement of the drive screw causes the axial movement of drive nut 26 and exendable rod 10. The extent of movement of extendable rod 10 both out of and back into tubular housing 6 is controlled by limit switch 8 which is coupled to the drive screw through cross helical gear 24 in a manner that is known within the art.

Furthermore, in order to provide lateral support for extendable rod 10, drive nut 26 contacts inner wall 7 of tubular housing 6 and thereby acts as a support for extendable rod 10. A support member 28 is secured to the free end of housing 6 and also provides support to extendable rod 10 against lateral forces.

Housing 6 should preferably be a sealed unit in order that the housing can be filled with a lubricant. For this purpose, a seal 76 is positioned between support 28 and extendable rod 10. By filling the housing with a lubricant, the life of the linear actuator can be significantly lengthened, since the heat generated on the drive nut 26 is transferred to the lubricant and to housing 6.

Figure 3:
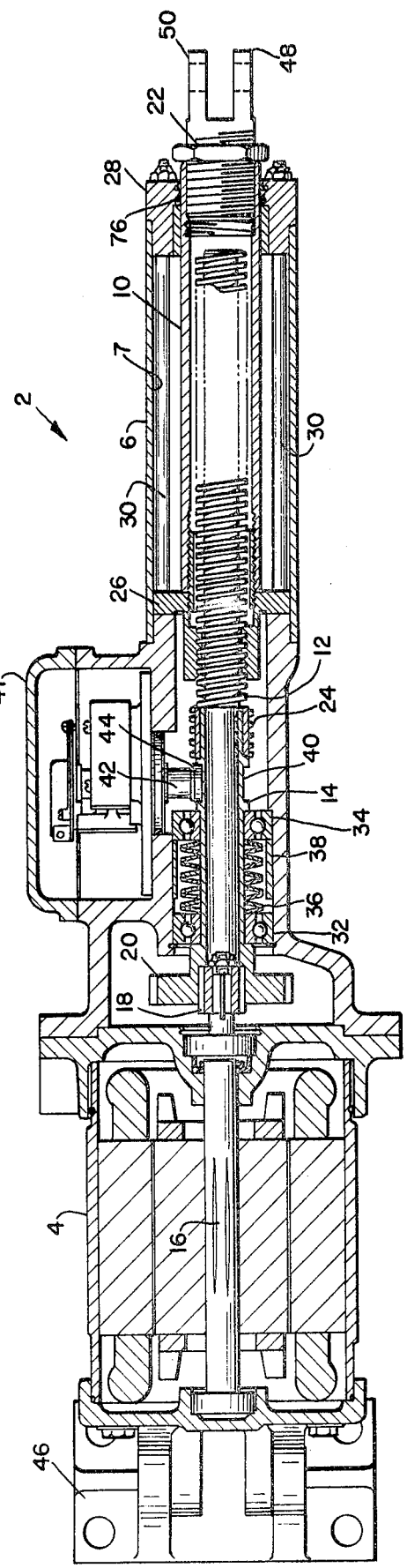
FIG. 3 is a top plan sectional view of the linear actuator illustrated in FIG. 1.

As illustrated in FIGS. 2 and 3 mounted on drive rod 14 are two bearing supports 32 and 34. A plurality of double acting springs 36 are mounted around drive rod 14 between bearing supports 32 and 34. These double acting springs 36 prevent axial movement of drive rod 14 and likewise drive screw 12 during normal operating conditions of the linear actuator by overcoming any thrust force created on the drive mechanism during such normal operation. Surrounding a portion of the double acting springs 36 is a thrust limit sleeve 38. This thrust limit sleeve acts to protect springs 36 from collapse during an overload situation where the thrust control mechanism has not properly acted to terminate operation of the drive motor.

Figure 4:
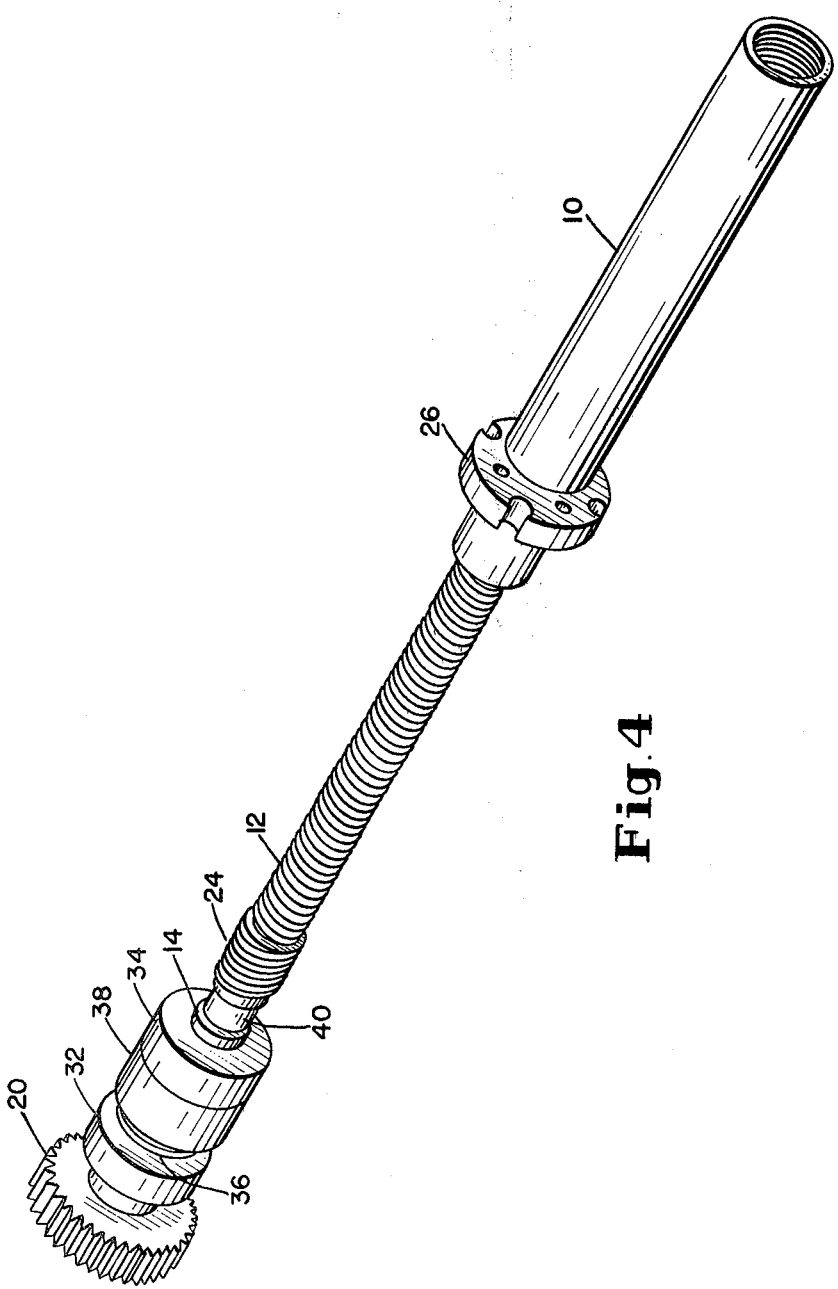
FIG. 4 is a perspective view of the drive mechanism of the linear actuator removed from the housing and without the motor.

In FIG. 4, there is an illustration of the drive mechanism removed from the housing. The parts of the drive mechanism shown in this figure are extendable rod 10, drive screw 12 and drive rod 14. In addition, U-shaped clevis 22 with its two arms 48 and 50 are mounted on the end of extendable rod 10, as shown in FIG. 3. At the coupling of drive rod 14 to drive screw 12 is cross helical gear 24. Surrounding drive rod 14 are bearings 32 and 34, double acting springs 36 and thrust limit sleeve 38. At the end of drive rod 14 is drive gear 20 which meshes with motor pinion 18 for rotating the drive rod. As seen in the figure, drive rod 14 has a recess 40 which acts to couple drive rod 14 to the thrust control mechanism.

Figure 7:
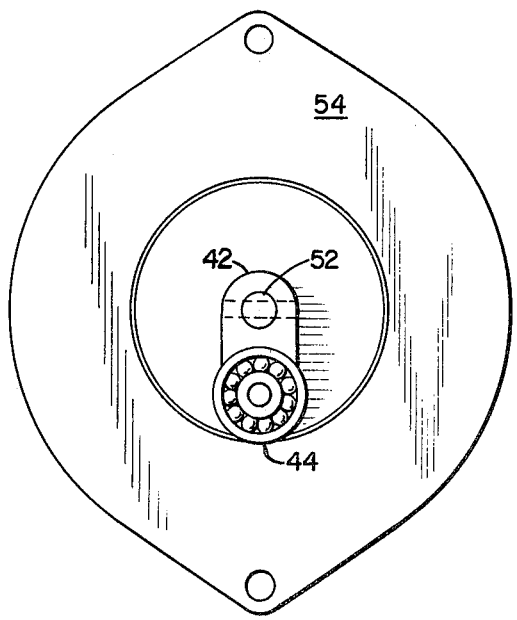
FIG. 7 is a side elevational view of a portion of the thrust control mechanism of the present invention.

Returning to FIGS. 2 and 3, a thrust control mechanism 41 is coupled to drive rod 14 through bearing 44 which is arranged within recess 40 for rotation on and axial movement with drive rod 14 whenever the drive rod moves in an axial direction. Bearing 44 is connected to a pivotable arm 42 which translates the movement of bearing 44 to the switching mechanism of thrust control mechanism 41. Pivotable member 42 is mounted on a shaft 52 for rotating the shaft whenever member 42 is pivoted. Bearing 44 and pivotable member 42 are mounted on one side of plate 54 as shown in FIG. 7.

Figure 5:
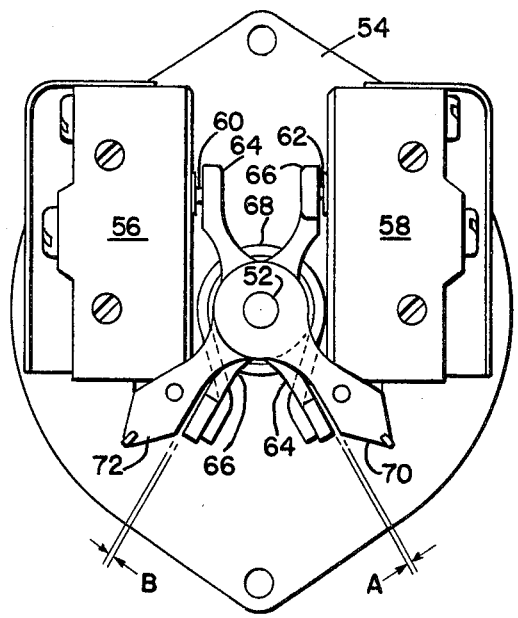
FIG. 5 is a side elevational view of the switching mechanism of the thrust control mechanism in accordance with the present invention.
Figure 6:
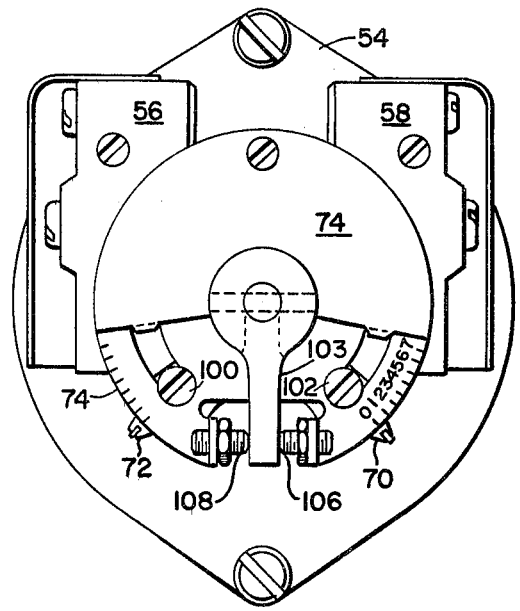
FIG. 6 is another side elevational view of the switching mechanism of the thrust control mechanism in accordance with the present invention.
Figure 8:
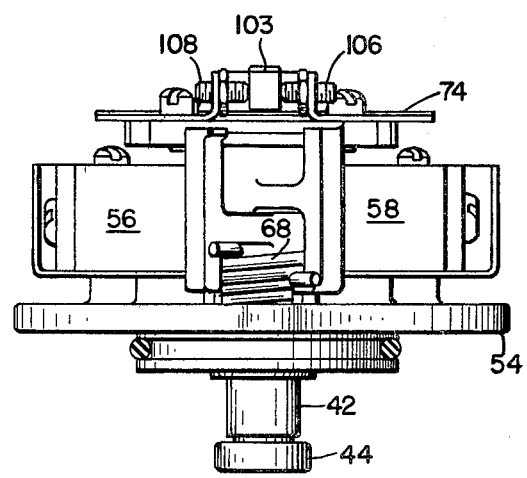
FIG. 8 is a top plan view of the switching mechanism of the thrust control mechanism of the present invention.

The switching mechanism of thrust control mechanism 41 is illustrated in FIGS. 5, 6 and 8. The switching mechanism is mounted on the side of plate 54 opposite pivotable member 42 and bearing 44. The switch mechanism includes two micro-switches 56 and 58. Each micro-switch has an actuating button, 60 and 62, respectively. Two coupling arms 64 and 66 are mounted on shaft 52. Coupling arms 64 and 66 are biased by spring 68 so that the ends of the coupling arms adjacent to actuating buttons 60 and 62 are depressing such buttons prior to actuation of the thrust control mechanism. Adjustable pointers 70 and 72 are spaced away from coupling arms 64 and 66, respectively. Pointers 70 and 72 are secured to dial plate 74 by means of adjusting screws 100 and 102 such as shown in FIG. 6. Dial plate 74 is coupled to driving arm 103 by means of set screws 106 and 108. Driving arm 103 is pinned to shaft 52 and rotates with the shaft as one piece.

As bearing 44 moves axially along with drive rod 14, pivotable arm 42 is pivoted. Such pivoting action rotates shaft 52 and driving arm 103. In turn rotation of shaft 52 and driving arm 103 will cause rotation of dial plate 74 and adjusting pointers 70 and 72, depending upon the direction of rotation, will reduce the space between pointers 70 or 72 and actuating arms 64 or 66. As the shaft continues to rotate one of the pointers (70 or 72) will contact an actuating arm (64 or 66) which in turn will release an actuating button (60 or 62) to interrupt the electric circuit to the driving motor. The distance by which adjustable pointers 70 and 72 must move before one of the arms 64 or 66 is contacted and a micro-switch activated depends on the setting of the respective pointers 70 and 72. Adjustment of the pointers controls the space between the lower ends of the actuating arms and the respective pointers. This space corresponds to the thrust level of force that must be transmitted to drive rod 14 for actuating one of the switches. Thus the greater distance driver rod 14 must move before one of the micro-switches is activated, the greater the applied thrust force before the thrust control mechanism is activated and the operation of the motor is terminated.

The operation of the linear actuator of the present invention is described below. During normal operation, axial movement is provided to a movable member attached to clevis 22 through linear actuator 2. The movable member is bolted to arms 48 and 50 and as extendable rod 10 moves in and out of housing 6 the movable member will move with the clevis. When rod 10 is to be extended, motor 4 is energized and rotates drive rod 14 through gears 18 and 20. Rotational movement of driver rod 14 is transmitted to drive screw 12 for rotating the drive screw. As drive screw 12 is rotated, such rotational movement is translated into axial movement of extendable rod 10 through drive nut 26. Rotation of the drive screw causes drive nut 26 to move along guide rods 30 so as to extend extendable rod 10 out of housing 6. Such movement continues until limit switch 8 determines that the rod has been extended to the extent desired and operation of the motor is terminated. A similar process occurs when extendable rod 10 is to be drawn back into housing 6, except that the direction of movement is reversed.

During operation, if an obstruction blocks the path of movement of the movable member being moved by the linear actuator so as to prevent its continued movement either in a direction out of the housing or back into the housing or if limit switch 8 fails to de-energize motor 4 so that the motor continues to attempt to move extendable rod 10 although it is fully drawn into the housing or fully extended from the housing an excessive thrust force is created. In response to such thrust force, the thrust control mechanism is activated for terminating operation of motor 4. In such a situation, before actuation of the thrust control mechanism, drive rod 14 and drive screw 12 will continue to rotate although extendable rod 10 will be prevented from moving. Since the extendable rod 10 cannot move in an axial direction, when the thrust force exceeds the force of springs 36, axial movement of drive screw 12 and drive rod 14 will begin to occur.

Such axial movement of drive rod 14 will cause bearing 44 to move axially with recess 40. As bearing 44 moves in an axial direction with drive rod 14, it moves pivotable member 42 which in turn rotates shaft 52 of the thrust control mechanism. Such rotational movement of shaft 52 in turn rotates arm 103, dial plate 74 and pointers 70 and 72. Once the pointers have moved a certain distance, which is preselected in dependence upon the level of thrust force that has been selected, the pointers move either actuating arm 64 or 66 to actuate one of the corresponding micro-switches. The actuated micro-switch in turn interrupts the circuit for driving motor 4 thereby terminating operation of the motor.

The distance by which the driver rod 14 moves indirectly correlates with the thrust force applied to the drive rod. When this force exceeds the biasing force applied by springs 36, movement of driver rod 14 occurs. The distance by which the driver rod moves depends upon the excess thrust force. Movement of drive rod 14 presses bearings 32 and 34 towards each other and compresses springs 36. In case the thrust control mechanism fails to operate, limit thrust sleeve 38 will prevent an excess of thrust force from destroying springs 36.

At the beginning of each stroke, the thrust switch can be temporarily electrically bypassed for the purpose of providing up to four times the normal thrust force for unseating wedged gates or other equipment which the actuator is used to actuate. Such an electrical bypass is optional and if included would be incorporated in limit switch 8.

The present invention may be embodied in other specific forms without departing from the spirit or essential characteristics thereof. The present embodiment is presented merely as illustrative and not restrictive, with the scope of the invention being indicated by the attached claims rather than the foregoing description. All changes which come within the meaning and range of equivalency of the claims are therefore intended to be embraced therein.

What is claimed is:
1. A linear actuator comprising:
    a housing;
    an extendable member having a load connecting member on its free end, said extendable member being arranged within said housing for axial movement so as to extend out of said housing;
    a drive screw attached to said extendable member so that rotation of said drive screw causes axial displacement of said extendable member;
    drive means for rotating said drive screw;
    a driver rod coupling said drive means to said drive screw;
    thrust control means coupled to said driver rod for interrupting the operation of said drive means when the thrust force on said drive screw exceeds selected thrust force limits, said thrust control means including adjustment means for enabling the thrust force limits to be selectively adjusted, without requiring disassembly of said linear actuator; and,
    two axially spaced bearings positioned along said driver rod and springs positioned around said driver rod and between said bearings for separating said bearings under normal operating conditions and said thrust control means senses when a thrust force causes said bearings to overcome the force of said springs and move closer together by a preselected distance, such distance corresponding to the selected thrust force limits and said adjustment means of said thrust control means being adjustable so that such distance is adjustable.

2. A linear actuator according to claim 1 wherein said drive means includes a motor and an electrical control means for operating said motor and said thrust control means is coupled to said electrical control means of said drive means so that when the thrust force exceeds the selected thrust limits said thrust control means interrupts said electrical control means and causes operation of said motor to be terminated.

3. A linear actuator according to claim 2 wherein said thrust control means includes: a coupling member positioned for movement with said driver rod when axial movement of said driver rod occurs; a pivotable member attached to said coupling member so that said pivotable member pivots upon movement of said coupling member; two switches, said switches being connected within said electric control means and being normally closed; and a pair of adjustable switching members each being associated with one of said switches and causing one of said switches to open upon the occurrence of a selected thrust force in either axial direction; said pivotable member when pivoted a certain preselected distance, such distance being dependent upon the selected thrust force limits, causes one of said switching members to open its corresponding said switch for interrupting said electrical control means and terminating the operation of said drive means.

4. A linear actuator according to claim 3 wherein each of said switches is a micro-switch with a respective actuating member extending therefrom and a spring biased arm is coupled to each of said actuating members for normally closing the respective said switch; and said pivotable member is capable of being coupled to said spring biased arms of said switches through said switching members upon pivoting movement of said pivotable member and said switching member by a distance dependent upon the selected level of thrust force at which each said switch is to be actuated so that when the thrust force exceeds the selected level one of said spring biased arms is moved out of contact with a corresponding one of said actuating members for opening the respective said switch.

5. A linear actuator according to claim 1 further comprising a thrust limit sleeve surrounding said springs and arranged between said bearings for preventing said bearings from moving closer together than the length of said sleeve from preventing collapse of said springs.

6. A linear actuator according to claim 1, 2, or 5 further comprising a first support member mounted at the end of said housing from which said extendable member extends, a second support member arranged within said housing and mounted on said extendable member for movement therewith, and guide rods arranged between said first and second support members for guiding axial movement of said extendable member.

7. An actuator according to claim 6 wherein said second support member is arranged in contact with the inner wall of said housing and said first and second support members support said extendable member against lateral forces.

8. An actuator according to claim 7 wherein said thrust control means includes a rotatable member positioned for rotation on and axial movement with said driver rod when axial movement of said driver rod occurs, said rotatable member serving to operate said thrust control means when said rotatable member has moved a certain distance.

9. A linear actuator according to claim 8 wherein said thrust control means further includes a pivotable member attached to said rotatable member so that said pivotable member pivots upon rotation of said rotatable member and two switches, said adjustment means being adjustable for switching said switches upon the occurrence of a selected thrust force in either axial direction, each of said switches having an associated switching member for causing switching of the respective said switch, and said pivotable member when pivoted a certain preselected distance, such distance being dependent upon the selected thrust force limits, causes said switching members to switch one of said switches for terminating the operation of said drive means.

10. A linear actuator comprising:
a housing;
an extendable member having a load connecting member on its free end, said extendable member being arranged within said housing for axial movement so as to extend out of said housing;
a drive screw attached to said extendable member so that rotation of said drive screw causes axial displacement of said extendable member;
drive means for rotating said drive screw;
a driver rod coupling said drive means to said drive screw; and,
thrust control means coupled to said driver rod for interrupting the operation of said drive means when the thrust force on said drive screw exceeds selected thrust force limits, said thrust control means including adjustment means for enabling the thrust force limits to be selectively adjusted, without requiring disassembly of said linear actuator, and said thrust control means further including a rotatable member positioned for rotation on and axial movement with said driver rod when axial movement of said driver rod occurs, said rotatable member serving to operate said thrust control means when said rotatable member has moved a certain distance.

11. A linear actuator according to claim 10 wherein said thrust control means further includes a pivotable member attached to said rotatable member so that said pivotable member pivots upon rotation of said rotatable member and two switches, said adjustment means being adjustable for switching said switches upon the occurrence of a selected thrust force in either axial direction, each of said switches having an associated switching member for causing switching of the respective said switch, and said pivotable member when pivoted a certain preselected distance, such distance being dependent upon the selected thrust force limits, causes said switching members to switch one of said switches for terminating the operation of said drive means.

12. A linear actuator according to claim 1, 2, 4 or 10 further comprising an actuator mounting member arranged at the end of said actuator opposite said load connecting member for mounting said actuator on a support base in such a manner that said linear actuator is pivotable with respect to said support base.

13. A linear actuator according to claim 1, 2, 4 or 10 further comprising sealing means for sealing the portion of said housing containing said drive screw so that said portion of said housing can be filled with a lubricant.

14. A linear actuator comprising:
a housing;
an extendable member having a load connecting member on its free end, said extendable member being arranged within said housing for axial movement so as to extend out of said housing;
a drive screw attached to said extendable member so that rotation of said drive screw causes axial displacement of said extendable member;
drive means for rotating said drive screw;
a driver rod coupling said drive means to said drive screw;
thrust control means coupled to said driver rod for terminating operation of said drive means when the thrust force on said drive screw exceeds selected thrust force limits;
two axially spaced bearings positioned along said driver rod; and,
springs positioned around said driver rod and between said bearings for separating said bearings under normal operating conditions and said thrust control means senses when an overload thrust force causes said bearings to overcome the force of said springs and move closer together by a preselected distance, such distance corresponding to the selected thrust force limits and said thrust control means being adjustable so that such distance is adjustable.

15. A linear actuator according to claim 14 further comprising a thrust limit sleeve surrounding said springs and arranged between said bearings for preventing said bearings from moving closer together than the length of said sleeve for preventing collapse of said springs.

16. A linear actuator according to claim 14 or 15 wherein said thrust control means includes a rotatable member positioned for rotation on and axial movement with said driver rod when axial movement of said driver rod occurs, said rotatable member serving to operate said thrust control means when said rotatable member has moved a certain distance.

17. A linear actuator according to claim 14 or 15 further comprising a first support member mounted at the end of said housing from which said extendable member extends, a second support member arranged within said housing and mounted on said extendable member for movement therewith, and guide rods arranged between said first and second support members for guiding axial movement of said extendable member.

18. An actuator according to claim 17 wherein said second support member is arranged in contact with the inner wall of said housing and said first and second support members support said extendable member against lateral forces.

19. An actuator according to claim 18 wherein said thrust control means includes a rotatable member positioned for rotation on and axial movement with said driver rod when axial movement of said driver rod occurs, said rotatable member serving to operate said thrust control means when said rotatable member has moved a certain distance.

20. A linear actuator according to claim 14 or 15 wherein said drive means includes a motor and an electrical control means for operating said motor and said thrust control means is coupled to said electrical control means of said drive means so that when the thrust force exceeds the selected thrust limits said thrust control means interrupts said electrical control means and causes operation of said motor to be terminated.

21. A linear actuator according to claim 20 wherein said thrust control means includes: a coupling member positioned for movement with said driver rod when axial movement of said driver rod occurs; a pivotable member attached to said coupling member so that said pivotable member pivots upon movement of said coupling member; two switches, said switches being connected within said electric control means and being normally closed; and a pair of adjustable switching members each being associated with one of said switches and causing one of said switches to open upon the occurrence of a selected thrust force in either axial direction; said pivotable member when pivoted a certain preselected distance, such distance being dependent upon the selected thrust force limits, causes one of said switching members to open its corresponding said switch for interrupting said electrical control means and terminating the operation of said drive means.

22. A linear actuator according to claim 21 wherein each of said switches is a micro-switch with a respective actuating member extending therefrom and a spring biased arm is coupled to each of said actuating members for normally closing the respective said switch; and said pivotable member is capable of being coupled to said spring biased arms of said switches through said switching members upon pivoting movement of said pivotable member and said switching member by a distance dependent upon the selected level of thrust force at which each said switch is to be actuated so that when the thrust force exceeds the selected level one of said spring biased arms is moved out of contact with a corresponding one of said actuating members for opening the respective said switch.

23. A linear actuator according to claim 14 or 15 further comprising an actuator mounting member arranged at the end of said actuator opposite said load connecting member for mounting said actuator on a support base in such a manner that said linear actuator is pivotable with respect to said support base.

24. A linear actuator according to claim 14 or 16 further comprising sealing means for sealing the portion of said housing containing said drive screw so that said portion of said housing can be filled with a lubricant.

25. A linear actuator comprising:
a housing having an inner wall;
an extendable member having a load connecting member on its free end, said extendable member being arranged within said housing for axial movement so as to extend out of said housing;
a drive screw attached to said extendable member so that rotation of said drive screw causes axial displacement of said extendable member;
drive means for rotating said drive screw;
a driver rod coupling said drive means to said drive screw;
a first support member mounted at the end of said housing from which said extendable member extends;
a second support member arranged within said housing and mounted on said extendable member for movement therewith, said second support member being arranged in contact with the inner wall of said housing and said first and second support members support said extendable member against lateral forces;
guide rods arranged between said first and second support members for guiding axial movement of said extendable member;
thrust control means coupled to said driver rod for terminating operation of said drive means when the thrust force on said drive screw exceeds selected thrust force limits; and,
two axially spaced bearings positioned along said driver rod and springs positioned around said driver rod and between said bearings for separating said bearings under normal operating conditions and said thrust control means senses when an overload thrust force causes said bearings to overcome the force of said springs and move closer together by a preselected distance such distance corresponding to the selected thrust force limits and said thrust control means being adjustable so that such distance is adjustable.

26. A linear actuator according to claim 25 further comprising a thrust limit sleeve surrounding said springs and arranged between said bearings for preventing said bearings from moving closer together than the length of said sleeve for preventing collapse of said springs.

* * * * *